(12) United States Patent
Yap et al.

(10) Patent No.: US 9,250,452 B1
(45) Date of Patent: Feb. 2, 2016

(54) TUNABLE PHOTONIC RF CIRCULATOR FOR SIMULTANEOUS TRANSMIT AND RECEIVE

(71) Applicant: HRL Laboratories, LLC, Malibu, CA (US)

(72) Inventors: Daniel Yap, Newbury Park, CA (US); James H. Schaffner, Chatsworth, CA (US); Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 13/651,399

(22) Filed: Oct. 13, 2012

Related U.S. Application Data

(60) Provisional application No. 61/546,804, filed on Oct. 13, 2011.

(51) Int. Cl.
*G02B 6/42* (2006.01)
*G02F 1/01* (2006.01)
*H01P 1/38* (2006.01)
*G02B 6/02* (2006.01)
*G02B 6/12* (2006.01)

(52) U.S. Cl.
CPC ............ *G02F 1/011* (2013.01); *G02B 6/02076* (2013.01); *G02B 6/4279* (2013.01); *H01P 1/38* (2013.01); *G02B 2006/12142* (2013.01)

(58) Field of Classification Search
CPC ............. G02B 6/4279; G02B 6/02076; G02B 2006/12142
See application file for complete search history.

(56) References Cited

U.S. PATENT DOCUMENTS

| 5,751,867 | A | 5/1998 | Schaffner et al. |
| 6,198,855 | B1 * | 3/2001 | Hallemeier ............. G02F 1/035 385/2 |
| 6,288,823 | B1 * | 9/2001 | Taylor ................... G02F 1/0344 359/251 |
| 6,771,844 | B2 * | 8/2004 | Chang ..................... G02F 1/011 385/1 |
| 7,555,219 | B2 | 6/2009 | Cox et al. |
| 7,657,132 | B1 * | 2/2010 | Yap et al. ........................ 385/10 |
| 7,809,216 | B2 | 10/2010 | Cox, III |
| 7,826,751 | B2 | 11/2010 | Cox et al. |
| 7,835,600 | B1 | 11/2010 | Yap et al. |
| 8,263,928 | B1 * | 9/2012 | Efimov .................... 250/227.11 |
| 8,750,709 | B1 | 6/2014 | Schaffner et al. |
| 2005/0014472 | A1 * | 1/2005 | Cox ......................... H04B 1/48 455/82 |
| 2005/0094917 | A1 * | 5/2005 | Wang et al. ........................ 385/8 |

(Continued)

OTHER PUBLICATIONS

Edward I. Ackerman, et al., "Optimization of Photonic Transmit/Receive Module Performance", Microwave Photonics, International Topical Meeting, Oct. 2009, p. 1-4.

(Continued)

*Primary Examiner* — Charlie Y Peng
(74) *Attorney, Agent, or Firm* — George R. Rapacki; Albert T. Wu

(57) ABSTRACT

An photonic RF circulator is described that provides greater than 40 db of isolation between a Received RF signal and a Transmitted RF signal in a simultaneous transmit and receive device. The photonic RF circulator uses light modulated in an optical waveguide grating where the Received RF signal co-propagates with the light and the Transmitted RF signal counter-propagates with the light. Variations described within provide for broadening the bandwidth of the T/R isolation and rejection of various noise sources.

17 Claims, 14 Drawing Sheets

(56) References Cited

U.S. PATENT DOCUMENTS

2007/0189778 A1* 8/2007 Burns et al. ............. 398/183
2009/0185810 A1* 7/2009 Kaplan et al. ............ 398/184

OTHER PUBLICATIONS

Ioan L. Gheorma, et al., "RF Photonic Techniques for Same Frequency Simultaneous Duplex Antenna Operation", IEEE Photonics Technology Letters, Jul. 2007, p. 1014-1016, vol. 19, No. 13.

Wan-Kyu Kim, et al., "A Passive Circulator with High Isolation using a Directional Coupler for RFID", School of ECE, University of Seoul, Seoul, 130-743, Korea, p. 1177-1180.

Osamu Mitomi, et al., "Design of Ultra-Broad-Band LiNbO3 Optical Modulators with Ridge Structure", IEEE Transactions on Microwave Theory and Techniques, Sep. 1995, p. 2203-2207, vol. 43, No. 9.

Pending U.S. Appl. No. 13/151,510, filed Jun. 2, 2011, "Electro-Optic Grating Modulator", Including References and Office Actions.

* cited by examiner

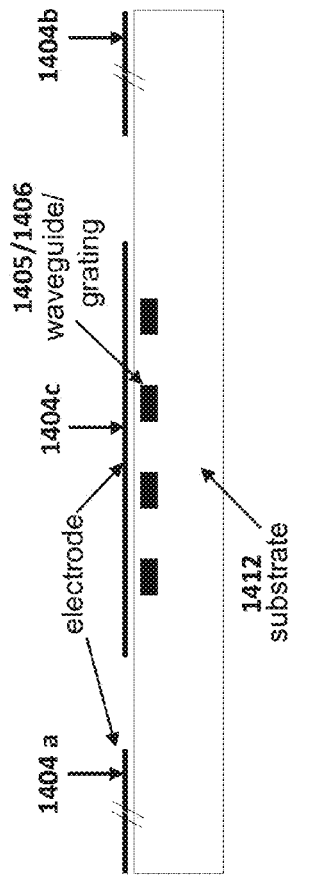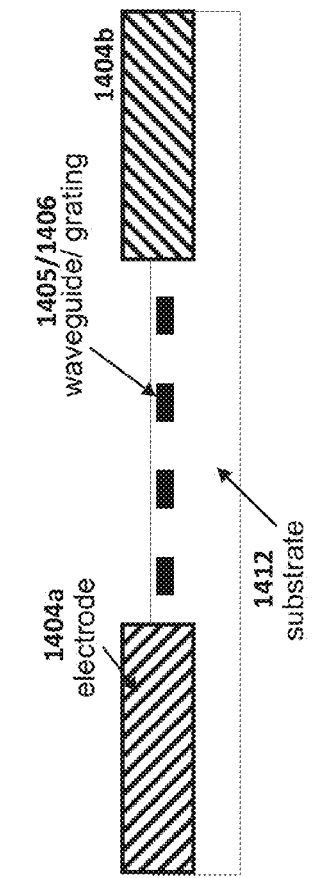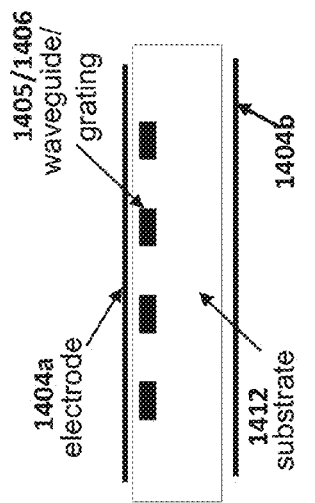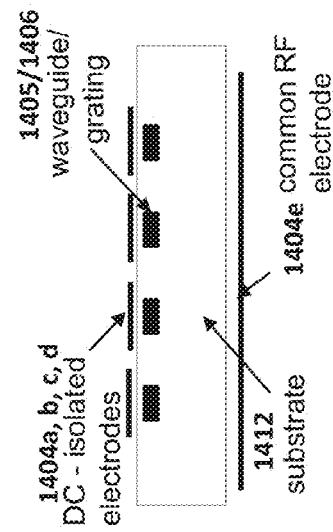
Fig 14.

TUNABLE PHOTONIC RF CIRCULATOR FOR SIMULTANEOUS TRANSMIT AND RECEIVE

CROSS REFERENCE TO RELATED APPLICATIONS

This application claims priority to provisional application 61/546,804 titled "Tunable Photonic RF Circulator and Antenna" filed Oct. 13, 2011. The contents of which are incorporated by reference herein.

TECHNICAL FIELD

This disclosure relates to a Radio Frequency (RF) circulator suitable for isolating the transmitted and received RF signals in a Simultaneous Transmit And Receive system (STAR).

BACKGROUND

Components used in optical or photonic links such as a laser, an optoelectronic modulator and a photodetector have been used in optical circulators for RF applications with limited success.

Prior art RF circulators based on ferrite isolators may achieve Transmit and Receive (T/R) isolation of 20-25 dB over a fairly large (e.g., octave) bandwidth. Although these ferrite isolators have T/R isolation notches whose enhanced isolation is as great as 40 dB, it is difficult or at least cumbersome to tune the frequency of these deep-isolation notches since that process requires tuning of the applied magnetic field. For comparison, typical levels of T/R isolation of 40-60 dB are required to enable STAR operation at typical transmit power levels and receiver sensitivity levels.

A patent issued to Cox and Ackerman ("Bi-directional signal interface," U.S. Pat. No. 7,555,219) describes an antenna interface with a non-reciprocal device comprising two waveguides—an RF waveguide 418 and an optical waveguide 416 that are coupled together, as illustrated in FIG. 1. The patent notes that the coupling between the RF and optical waveguides is weak or negligible when the RF and optical waves in those waveguides counter-propagate.

This prior patent as well as an article by Ackerman and Cox ("Optimization of photonic transmit/receive module performance," Technical Digest International Topical Meeting on Microwave Photonics, 2009, IEEE) describe a Mach-Zehnder electro-optic modulator whose RF electrodes are coupled to an antenna, as illustrated in FIG. 2. The transmit signal is coupled via those RF electrodes to the antenna. The received signal from the antenna is coupled to the RF electrodes of the modulator such that the received signal propagates in the same direction as the laser light supplied to the modulator to be modulated and the transmit signal propagating in the RF electrodes counter-propagates. In this prior art Mach-Zehnder modulator, the enhanced T/R isolation is achieved at fixed frequency values that cannot be tuned; hence changing the wavelength of the light modulated by the received signal does not affect its T/R isolation.

An article by W. K. Kim, et al. ("A passive circulator with high isolation using a direction coupler for RFID," Proceedings of 2006 IEEE Intl. Microwave Symposium, p. 1177) describes a method to achieve 49 dB of T/R isolation by using RF-phase cancellation of the Transmit leakage. This prior electrical domain approach make use of passive RF components to tap a portion of the transmit signal, adjust its phase and magnitude and then feed that tapped and modified transmit signal to cancel the transmit leakage into the receive path. The photonic RF circulator disclosed herein may make use of a cancellation process but in the optical domain.

A tunable variant of the prior circulator is described in a presentation given by V. Fusco ("Tunable high isolation directional coupler based circulator," 2009 IET Seminar on Adaptable and Tunable Antenna Technology for Handsets and Mobile Computing Products) and is illustrated in FIG. 3. This is another electrical domain solution but with limited adjustability. The authors demonstrated tuning of the isolation notch over a frequency range covering 40% of the notch frequency.

An article by Gheorma and Gopalakrishnan ("RF photonic techniques for same frequency simultaneous duplex antenna operation," IEEE Photonics Technology Letters, vol. 19, no. 13, Jul. 1, 2007, p. 1014) describes a circulator that makes use of the RF reflection from a second antenna to cancel the reflection of the RF transmit signal occurring in a first antenna. This prior circulator involves coupling light at two different wavelengths into a single photonic modulator such that the two wavelengths of light propagate in opposite directions through that modulator, as illustrated in FIG. 4. Thus, one wavelength co-propagates with the received RF signal, plus a reflected transmit signal obtained from the first antenna and the other wavelength of light co-propagates with the reflected RF transmit signal obtained from the second antenna. The modulated output light at the two wavelengths is detected by a set of differential photodetectors. This approach requires the modulator to be coupled to two different antennas, with only one of those antennas being active.

There is a continuing and long felt need for an RF circulator with 40-60 dB T/R isolation to enable STAR operation. The prior approaches, previously described do not enable the desired combination of high T/R isolation and frequency tunability. To enable STAR operation, the presently disclosed photonic RF circulator according to the principles of the present invention make use of an optical waveguide grating modulator with velocity-matched electrodes and a frequency tunable laser.

SUMMARY OF THE INVENTION

A photonic RF circulator for simultaneous transmit and receive operation with RF signals is disclosed which is compatible with high-frequency electrical modulation signals of limited bandwidth. The photonic RF circulator according to the principles of the present invention comprises an optical grating formed in an optical waveguide constructed from electro-optic (EO) material and an electrode that is an RF waveguide or RF transmission line that conducts a traveling-wave electromagnetic (EM) field. The electrodes of the RF waveguide or RF transmission line contain a portion of the optical waveguide and preferably the entire optical waveguide grating. The RF received signal is coupled into an RF electromagnetic field that propagates through the RF waveguide or transmission line in a direction that is parallel to the direction of light that is inserted in, and propagates in, the optical-grating waveguide where the electromagnetic field overlaps the optical-grating waveguide. The light travels along the optical-grating waveguide preferably at the same velocity as the RF EM field travels along the RF waveguide or transmission line. Exemplary embodiments described herein include optical-grating waveguides with grooves etched into EO material to form the grating and optical-grating waveguides with grooves etched into a high-refractive index material deposited above the EO material to form the grating. The RF Transmitted signal is coupled to the RF wave guide opposite from the Received signal such that the RF transmitted signal propagates counter to the light in the optical waveguide. By selecting the optical grating characteristics, the RF waveguide, optical waveguide and tunable laser light source, the resulting RF circulator according to the principles of the present invention will maintain 20-60 db isolation between the RF Transmitted signal and the RF Received signal.

In addition, the photonic RF circulator according to the principles of the present invention is coupled to a single antenna or antenna array element. Also, the photonic RF circulator according to the principles of the present invention couples modulated light of the same wavelength that are obtained from two different optical waveguide gratings, into a set of differential photodetectors. Compared to the prior approach, the photonic RF circulator according to the principles of the present invention has the advantage that it does not require a second antenna, which actually is not useful for receiving signals but which adds to the size and weight of the antenna system. Also, the prior approach has the disadvantage that its performance depends on having the second antenna and second RF circulator identical to the first antenna and first RF circulator.

In contrast to U.S. Pat. No. 7,555,219 to Cox and Ackerman, the presently disclosed photonic RF circulator according to the principles of the present invention has strong coupling between the RF signals and optical waveguides (i.e., between the RF electrode and the optical waveguide grating) even for the counter-propagating case. With the optical waveguide grating of the presently disclosed photonic RF circulator, for the case of counter-propagating RF and optical fields, the modulations of the coherent grating reflection occurring in different portions of the optical waveguide grating along the length of that grating cancel so that the net transmission of light through the whole grating is not modulated. That is, for some portions the grating reflection is increased but for other portions the grating reflection is decreased, so the net change in reflection is zero.

BRIEF DESCRIPTION OF THE DRAWINGS

FIG. 8 is a Scanning Electron Micrograph photo of the grating formed in a lithium niobate optical waveguide.

FIG. 14a illustrates a first configuration of RF electrodes and multiple optical-waveguide gratings.

FIG. 14b illustrates a second configuration of RF electrodes and multiple optical-waveguide gratings.

FIG. 14c illustrates a third configuration of RF electrodes and multiple optical-waveguide gratings.

FIG. 14d illustrates a fourth configuration of RF electrodes and multiple optical-waveguide gratings.

DETAILED DESCRIPTION

Figure 1:
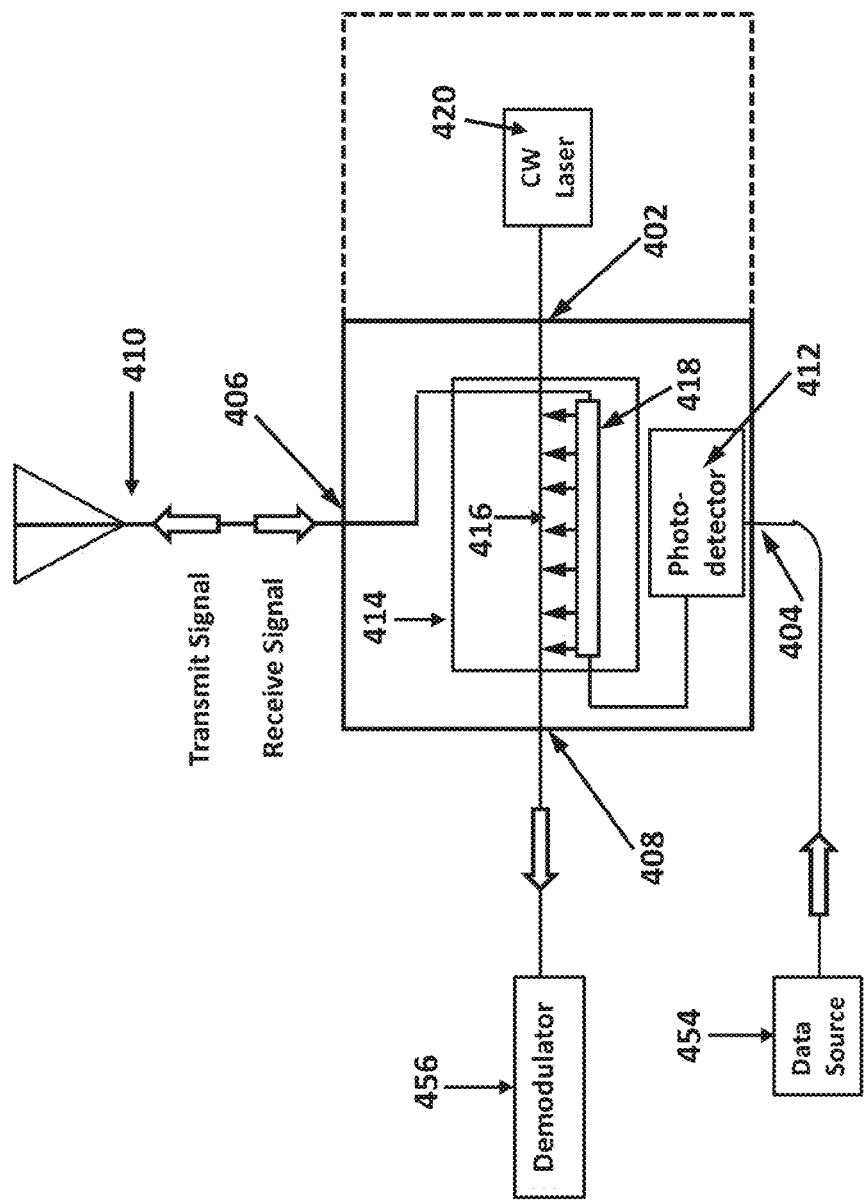
FIG. 1 is an illustration of a non-reciprocal RF-Photonic device without a grating in the optical path coupled to an antenna known in the prior art.
Figure 2:
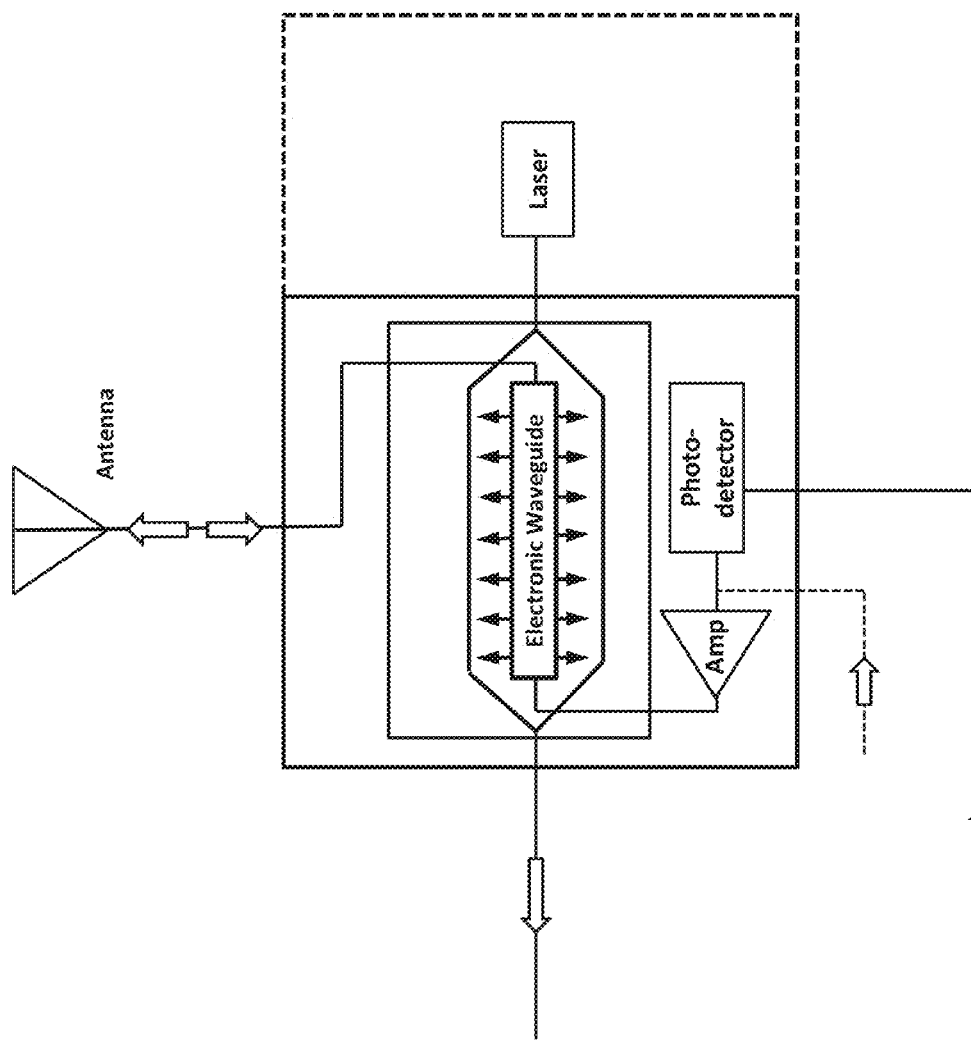
FIG. 2 is an illustration of a Mach-Zehnder electro-optical modulator with travelling-wave electrodes coupled to an antenna known in the prior art. Note this device does not use an optical grating in the optical path.
Figure 3:
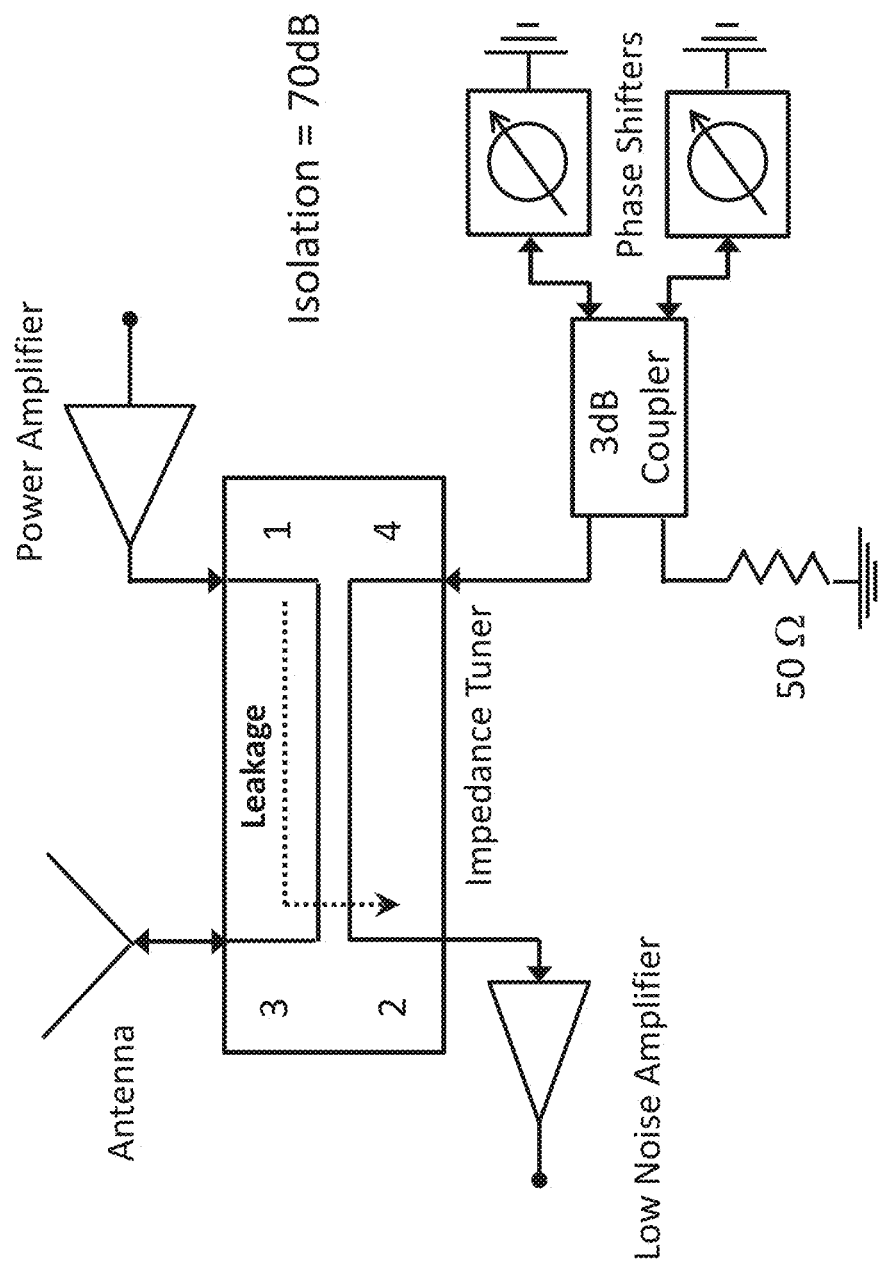
FIG. 3 is a Tunable RF Circulator based on RF directional coupler and a tunable load known in the art.
Figure 4:
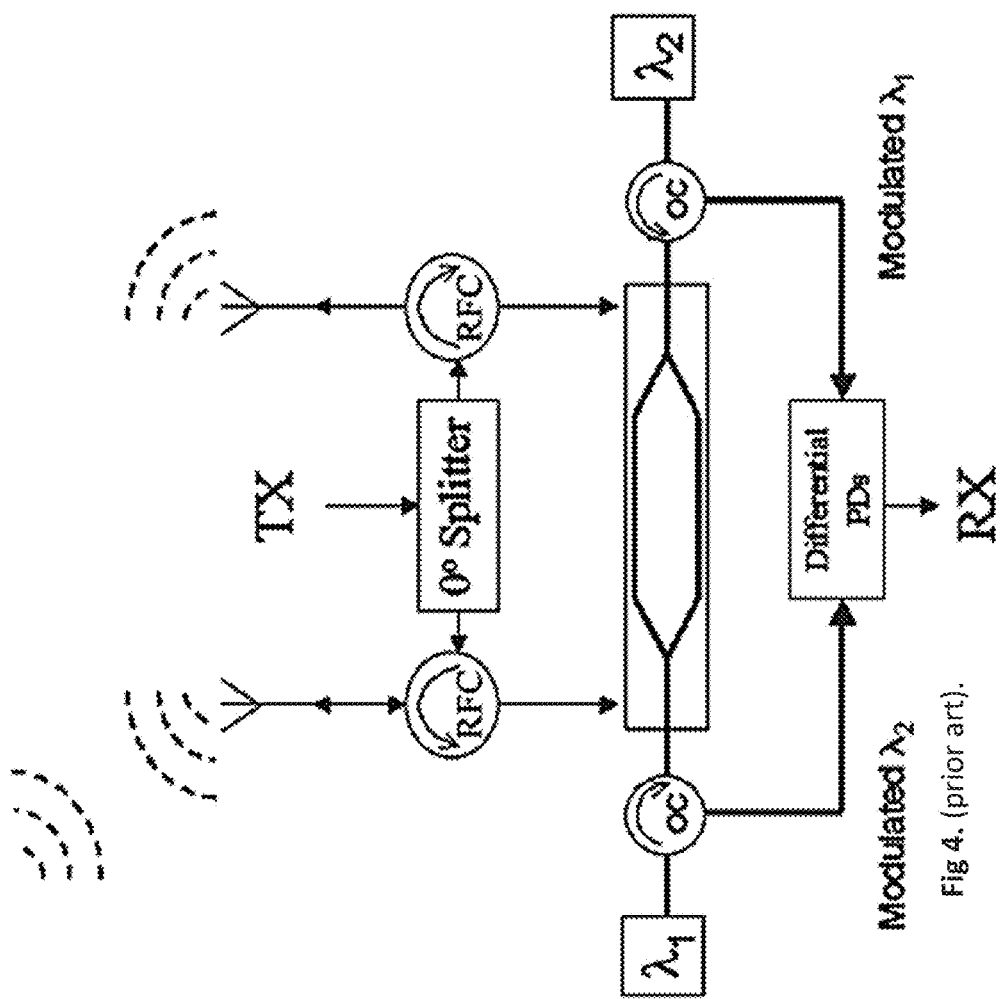
FIG. 4 is an RF circulator with photonic cancellation obtained by RF reflection from a second antenna known in the art.
Figure 5:
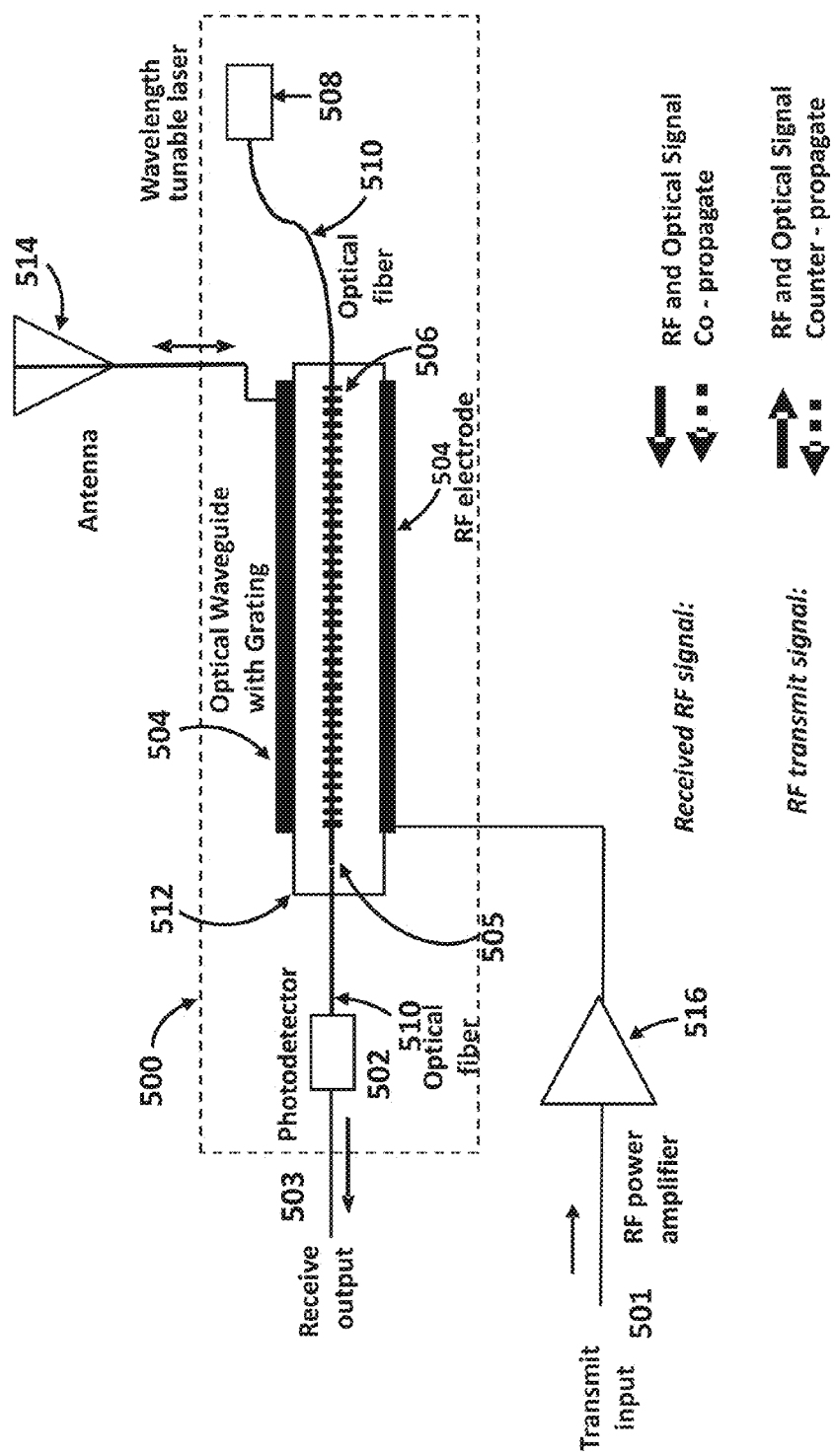
FIG. 5 is a Photonic RF circulator coupled to an antenna according to the principles of the present invention.

FIG. 5 shows one embodiment of the photonic RF circulator 500 according to the principles of the present invention. This photonic RF circulator 500 has a transmit input 501 that is coupled to a source of a transmit signal and a receive output 503 that typically is coupled to an RF receiver. The RF transmit signal travels from the signal source through the photonic RF circulator 500 to an antenna 514. An RF received signal, received by the antenna 514, travels from the antenna 514 through the photonic RF circulator 500 to the RF receiver via the receive output 503. The path between the photonic RF circulator 500 and the antenna 514 is bi-directional. In many applications it is desirable for the antenna 514 to simultaneously transmit a signal, at a given frequency, and receive a signal, at that same frequency (or a nearby frequency). Such simultaneous transmit and receive (STAR) operation is made possible by the photonic RF circulator 500. The photonic RF circulator 500 according to the principles of the present invention isolates the receive output 503 from the transmit input 501. Thus, the leakage of the RF transmit input 501 into the receive output 503 of the photonic RF circulator 500 is very low. In many practical applications, it is desirable for this transmit-to-receive isolation (T/R isolation) of the photonic RF circulator 500 to be as great as 40-60 dB. It also is desirable for the insertion loss of the RF transmit signal through the photonic RF circulator 500 to the antenna 514 to be low. And it is desirable for the insertion loss of the RF received signal from the antenna 514 through the photonic RF circulator 500 to be low. The photonic RF circulator 500 according to the principles of the present invention shown in FIG. 5 combines a purely RF path for the transmit signal with an RF-photonic path or channel for the received signal. An RF power amplifier 516 can be included in the transmit path to amplify the transmit signal before that transmit signal is supplied to the antenna 514. Part of the receive path comprises an RF path from the antenna 514 to an RF electrode 504 that is coupled to an optical waveguide 505 with an optical grating 506 and a second RF path from a photodetector 502 to the receive output 503. Another part of the receive path comprises an optical path involving an optical waveguide 505 with an optical grating 506, optical fibers 510, and a photodetector 502. The RF electrode 504 is located in proximity to the optical grating 506 and serves as the electrode that supplies a RF modulation signal for modulating the coherent optical reflection of the optical grating 506. The RF modulation signal in the RF electrode 504 modulates the electric field applied to the optical waveguide 505 material within the optical grating 506. This modulation of that electric field in turn modulates the refractive index of the electro-optic material of the optical grating 506, thereby modulating the coherent reflection of the light from the periodic refractive-index steps of the gratings of the optical grating 506, and thus modulates the optical intensity of the light transmitted through and coupled out from the optical waveguide 505 and the optical grating 506.

Laser light to be modulated is coupled into the optical waveguide 505 and optical grating 506 via the optical fiber 510 from the wavelength tunable laser 508. Laser light that is transmitted through the optical waveguide 505 and optical grating 506 becomes intensity modulated by the modulated reflection of the optical grating 506. The laser light is then coupled from the optical waveguide 505 to a photodetector 502 via another optical fiber 510. The optical fibers 510 preferably have low optical insertion loss as well as immunity to electro-magnetic interference from the RF signals. The optical waveguide 505, optical grating 506 and the RF electrode 504 are preferably located very close to the antenna 514 and in one preferred embodiment are integrated into the physical antenna 514 itself. The optical fibers 510 provide a way to remotely locate the wavelength tunable laser 508, the photodetector 502 and the RF receiver from the antenna 514. In one preferred embodiment, the RF signal generator, which produces the transmit signal, likewise could be located remotely from the antenna 514 and coupled by another optical fiber (not shown) to the photonic RF circulator 500. Optical connections to a remote antenna 514 are well known in the art as comprising optical fibers, a photo-detector, laser or modulator. Without implying a limitation, these optical connections to a remote antenna are not shown.

In the photonic RF circulator 500 according to the principles of the present invention, the received RF signal co-propagates with the laser light in the optical waveguide 505 and optical grating 506 while the RF transmit signal counter-propagates with that laser light. Moreover, the frequency of the laser 508, the operating frequency of the RF signal and the optical grating 506 are selected to provide velocity matching between the received RF signal in the RF electrodes 504 and the optical signal co-propagating through the optical waveguide 505. Thus, the RF output obtained from the photodetector 502 has much higher gain for the received signal than for the transmit signal.

Figure 6:
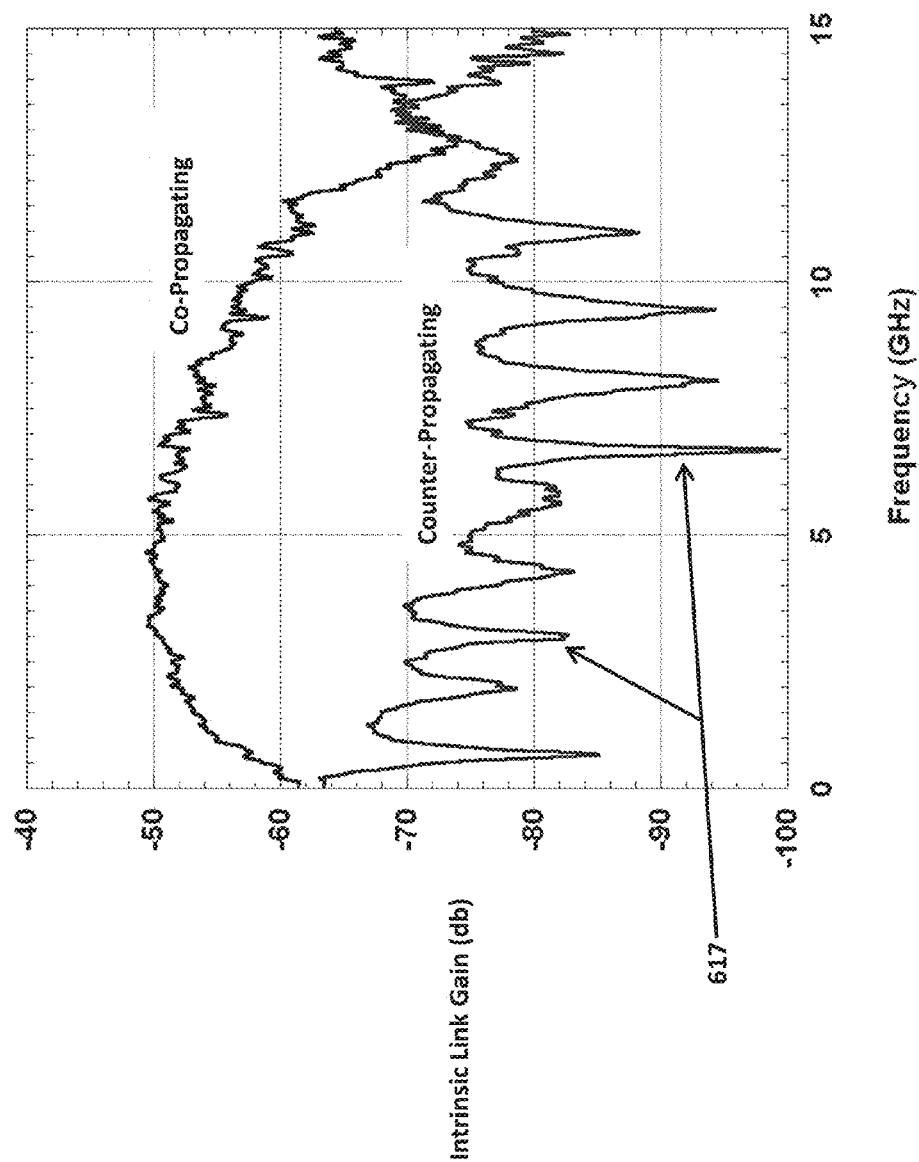
FIG. 6 is a plot illustrating the isolation between the transmitted and received signals in the embodiment of FIG. 5.

The frequency response of the RF-input to RF-output of this photonic RF circulator 500 according to the principles of the present invention shown in FIG. 5 depends on the propagation directions of the optical field (the light) and the RF field. The measured frequency response of an RF photonic link using a photonic RF circulator 500 is shown in FIG. 6. FIG. 6 shows that the RF-to-RF link gain is much higher for the co-propagating case than it is for the counter-propagating case. In addition, for certain frequencies of the RF signal, the link gain in the counter-propagating case has tunable deep notches 617. These notches 617 can be so deep that the link gain for the co-propagation case is more than 40 dB greater than the link gain for the counter-propagation case at those frequencies where the notches occur.

Figure 7:
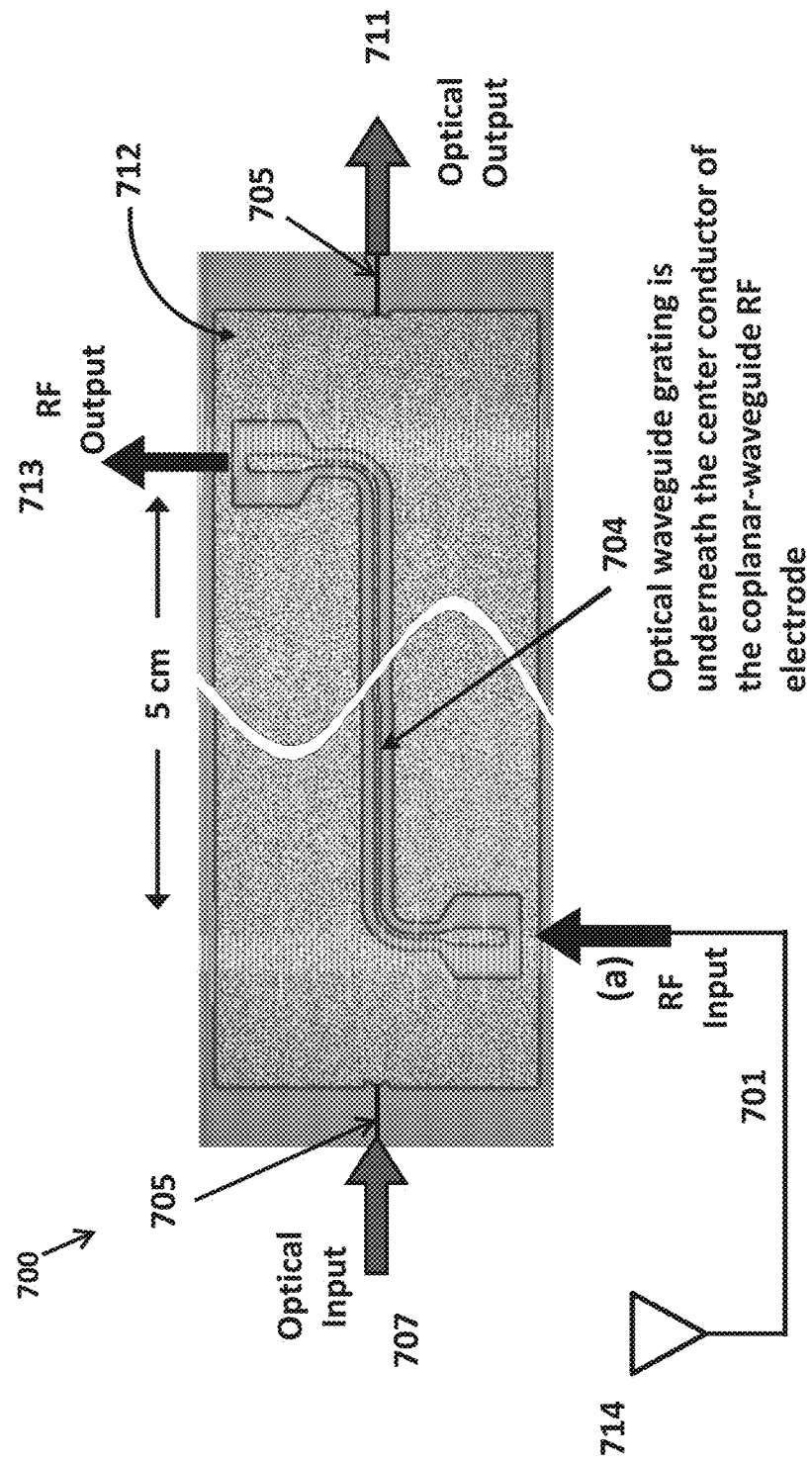
FIG. 7 illustrates an exemplary optical waveguide grating modulator showing the RF electrodes, optical waveguide and optical grating according to the principles of the present invention.
Figure 8:
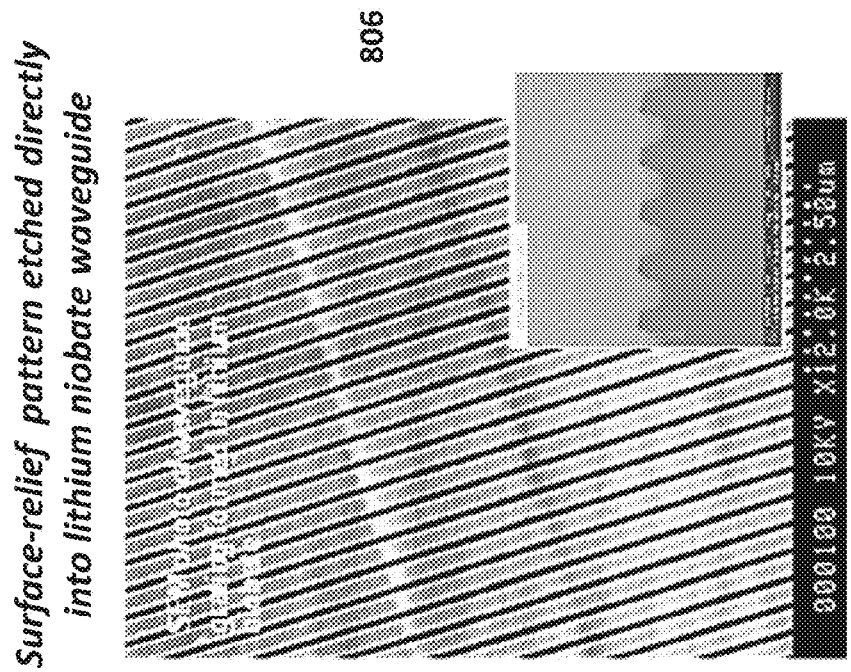
FIG. 8 illustrates the details of the optical grating in FIG. 7.

FIGS. 7 and 8 show photographs of an exemplary electro-optical waveguide grating modulator 700 comprising an optical waveguide 705 and optical grating fabricated in Z-cut lithium niobate electro-optic material 712. The modulator 700 has a coplanar waveguide (CPW) transmission line RF electrode 704 structure, as shown in FIG. 7 but with a single optical waveguide 705. Alternatively the RF electrodes 704 may form a micro-strip transmission line, a coplanar strip transmission line or a slot line transmission line. The single optical waveguide 705 of this electro-optical waveguide grating modulator 700 is located under the center conductor of the CPW RF electrodes 704 but extends beyond the central portion of the CPW RF electrodes 704 to the edges of the piece of lithium niobate electro-optic material 712 on which the electro-optical waveguide grating modulator 700 is formed. Laser light to be modulated is coupled into the optical waveguide 705 at one edge of the lithium niobate electro-optic material 712 and modulated laser light is coupled out from the optical waveguide 705 at the opposite edge. The CPW RF electrode 704 have a central portion and 90-degree bends at its two end portions. The optical waveguide 705 located under the central portion of the CPW RF electrode 704 has an optical grating formed in the optical waveguide 705. The optical grating is formed by etching a surface relief pattern into the titanium-diffused lithium niobate electro-optic material 712, as shown in the detail photograph of FIG. 8. The stepped surface-relief pattern formed in the optical waveguide 705 results in a periodically stepped pattern of the optical refractive index seen by the light propagating through the optical waveguide 705 and grating.

The optical waveguide 705 and grating is oriented such that the axis of optical propagation is aligned parallel to the Poynting vector of the electromagnetic field between the RF electrodes 704. Moreover, the RF field overlaps the optical field.

An RF input from an antenna 714 is guided by the RF electrode 704 and propagates from an input end 701 to an output end 713 of the RF electrodes 704. In FIG. 7 the electro-optical waveguide grating modulator 700 input end 701 is designated as such so that the RF input co-propagates (in the same direction) with the optical input 707. This designation is not dependent on the structure of the electro-optical waveguide grating modulator 700 shown in FIG. 7

Alternatively, the light propagating through the electro-optical waveguide grating modulator 700 can counter-propagate (in the opposite direction) with respect to the RF signal field propagating in the RF electrode 704. This occurs when an RF signal is received at the RF output 713.

The design of the optical waveguide grating in the electro-optical waveguide grating modulator 700 of FIGS. 7 and 8 is known to those of ordinary skill in the art according to the following guidelines.

The optical grating 806 of FIG. 8 has a periodic variation of the refractive index and there typically are a very large number (e.g., several hundred to several tens of thousands) of these index steps. In an optical waveguide grating modulator, a very small amount of light is reflected from each refractive-index step of the grating. The amount of reflection depends on the size of the index step. A small change in the overall refractive index of the electro-optic material of the grating produces a small change in the reflection from each step. However, the overall reflection of light by the entire grating depends mainly on the optical interference among the many small amounts of light reflected from the many index steps and the propagation of that reflected light between a given reflecting index step and the other steps of the grating. If that cumulative interference is constructive, the net reflection by the grating (and the net reduction of the transmission through the grating) is near 100%. If the cumulative interference is destructive, the net reflection is weak and the net transmission is substantially zero or very small. This cumulative interference depends on the wavelength of the light, the refractive index of the material, and the spatial-period of the grating. Without implying a limitation, when the material is an electro-optic material such as lithium niobate or GaAs or some polymers, this cumulative interference, as well as the coherent reflection at each index step of the grating can be varied by applying an electric field to that material. In addition to the small amount of light reflected from each index step, another small amount of light is scattered by that discontinuity in the optical waveguide. For a grating formed near the surface of the electro-optic substrate, the scattered light is directed primarily into the substrate at some angle related to the wavelength of the input light. The amount of transmission through the entire grating is the portion of the input light that is not scattered away and that is not reflected by the grating. When the applied RF field modulates the effective refractive index of the electro-optic material, it also modulates the cumulative interference among the reflected portions of the input light and thus modulates both the net reflection and net transmission obtained at the output of the waveguide grating.

Details on the design of a electro-optical modulator with a waveguide grating suitable for a photonic RF circulator are described in: N. Dagli "High-speed photonic devices," CRC Press, 2007, Chapter 3; U.S. Pat. No. 6,640,020 (S. Ionov, "Method and apparatus for electro-optic delay generation of optical signals," issued Oct. 28, 2003); and the review by J. Hukriede, D. Runde, D. Kip, "Fabrication and application of holographic Bragg gratings in lithium niobate channel waveguides," J. Phys. D: App. Phys. v.36, pp. R1-R16, 2003, the entire content of all three of which is incorporated herein by reference.

Velocity matching the received RF electric field with the co-propagating optical field is described in a U.S. patent application Ser. No. 13/151,510 filed Jun. 2, 2011 titled Electro-Optic Grating Modulator and U.S. Pat. No. 8,078,014 issued Dec. 13, 2011 High-Speed Electro-Optical Modulator both of which are incorporated by reference herein.

From a design standpoint, the velocity of the optical field is substantially matched to the velocity of electrical field when:

$$n_{opt}*L - n_{RF}*L < \lambda_{RF}/2$$

where $n_{opt}$ is the effective index of refraction of the optical waveguide, $n_{RF}$ is the effective index of refraction of the RF waveguide, L is the length of the grating disposed on the optical waveguide and $\lambda_{RF}$ is the wavelength of the RF received signal.

Without implying a limitation, FIG. 14 illustrates four of many possible arrangements of RF electrodes 1404 with respect to one or more optical waveguides 1405.

Without implying a limitation, the several exemplary configurations of the RF electrodes 1404 and the multiple optical-waveguides 1405 with gratings 1406 in FIG. 14 are shown as cross-sectional views of the structures. In particular, the illustrated number of optical-waveguides do not imply a limitation. More or fewer optical-waveguides 1405 may be used. FIG. 14a illustrates RF electrodes 1404a and 1404b that form a parallel-plate RF waveguide with the optical waveguide 1405 and grating 1406 sandwiched between the RF electrodes 1404a and 1404b. FIG. 14b illustrates an RF electrode arrangement that is a coplanar-waveguide transmission line. The RF electrodes on either side, 1404a and 1404b, are electrically connected together. The center RF electrode 1404c is electrically opposite the electrodes 1404a and 1404b. FIG. 14c illustrates a slot line arrangement of RF electrode 1404a and 1404b. FIG. 14d illustrates an RF electrode structure comprising a common RF electrode 1404e and multiple DC-isolated electrodes 1404a-1404d that are capacitively coupled together. The capacitively coupled together RF electrodes 1404a-1404d may be individually biased with a DC signal to allow adjustment of the frequency of maximum T/R isolation as noted in the discussion of FIG. 6. Note that the optical waveguides 1405 and gratings 1406 are illustrated schematically as simple rectangles. In actuality, the structures of those gratings 1406 are more complicated than illustrated, as known to those of skill in the art. The optical waveguide 1405 and gratings 1406 can be made from materials such as lithium niobate, gallium arsenide or electro-optic polymer. For example and without implying a limitation, the substrate 1412 in FIG. 14 may be lithium niobate. The optical waveguides 1405 may be titanium doped channels in the lithium niobate substrate 1412.

The lithium niobate substrate 1412 and waveguide 1405 also could serve as a dielectric material of the antenna. The specific configuration selected for the RF electrodes 1404 may depend on the type of antenna connected to the RF electrodes 1404 or the integration of RF electrodes 1404 with the optical-waveguide gratings 1406. Because the cross-sectional area of the optical-waveguide grating is small (less than 10 microns wide by approximately 0.4 microns deep, length is on the order of a centimeter), the spacing between adjacent waveguides can also be small (less than 20 microns), the configuration of either FIG. 14a or FIG. 14c could be used for many RF antenna structures such as a Vivaldi antenna or a flared notch antenna, which generally comprise two comparatively thick regions of metal that are separated by a region of dielectric material. The optical waveguides 1405 would be located in that region of dielectric material bounded by the thick regions of metal.

In one aspect of the invention, the optical gratings 1406 may be covered by a dielectric material different from the lithium niobate of the substrate 1412.

In general, it is desirable that the RF electric field experienced by one optical waveguide 1405 be the same as the RF electric field experienced by another optical waveguide 1405. For example, the parallel-plate RF waveguide illustrated in FIG. 14a applies the same electric field for different locations along the width of that RF waveguide. Hence each optical waveguide 1405 in FIG. 14a experiences the same RF electric field. The number of optical waveguides 1405 is constrained by a requirement that all optical waveguides 1405 be coupled to the same RF electrode 1404 where those optical waveguides are intended to operate in parallel, such that those parallel optical waveguides 1405 are modulated by the same RF received signal and RF transmit. RF electrode 1404 configurations, such as the coplanar waveguide transmission line (FIG. 14b), the microstrip transmission line (FIG. 14a) and the slot line (FIG. 14 c), will impress a more uniform electric field distribution when the optical waveguides 1405 are located near the center of the center conductor of the coplanar waveguide (FIG. 14b) or microstrip transmission line (FIG. 14a) or near the center of the gap in the slot line (FIG. 14c).

An alternative embodiment allows for compensating for some non-uniformity of the electric field distribution between the RF electrodes 1404 by adjusting the intensities of the laser light supplied to the various optical waveguides 1405. This adjustment of the intensity of the light coupled into a given optical waveguide 1405 will change the RF-to-RF gain associated with that optical waveguide 1405 and can compensate for a corresponding variation of the RF field strength experienced by that optical waveguide 1405.

Figure 9:
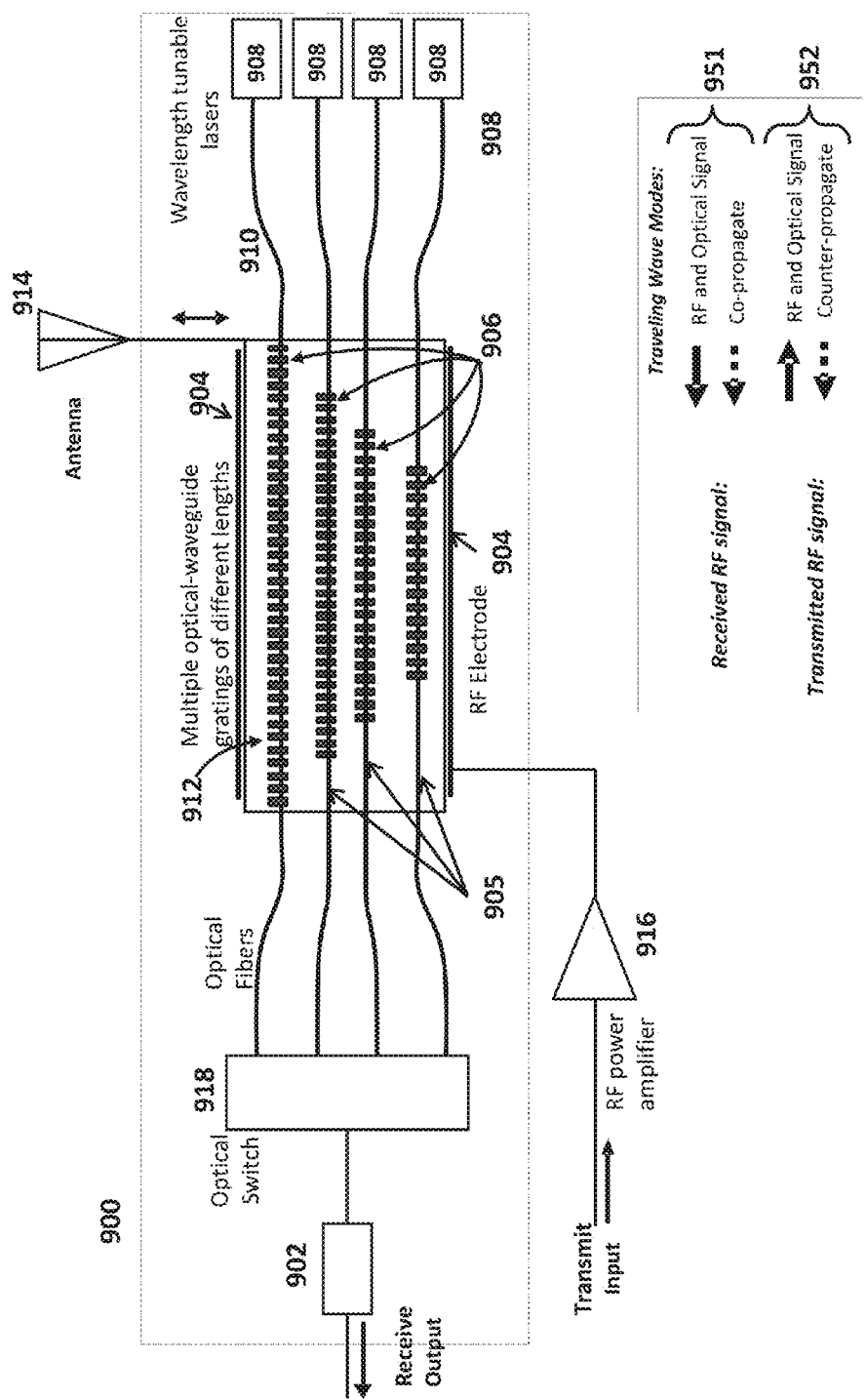
FIG. 9 shows a photonic RF circulator with a velocity-matched modulator comprising multiple optical grating waveguides.
Figure 10:
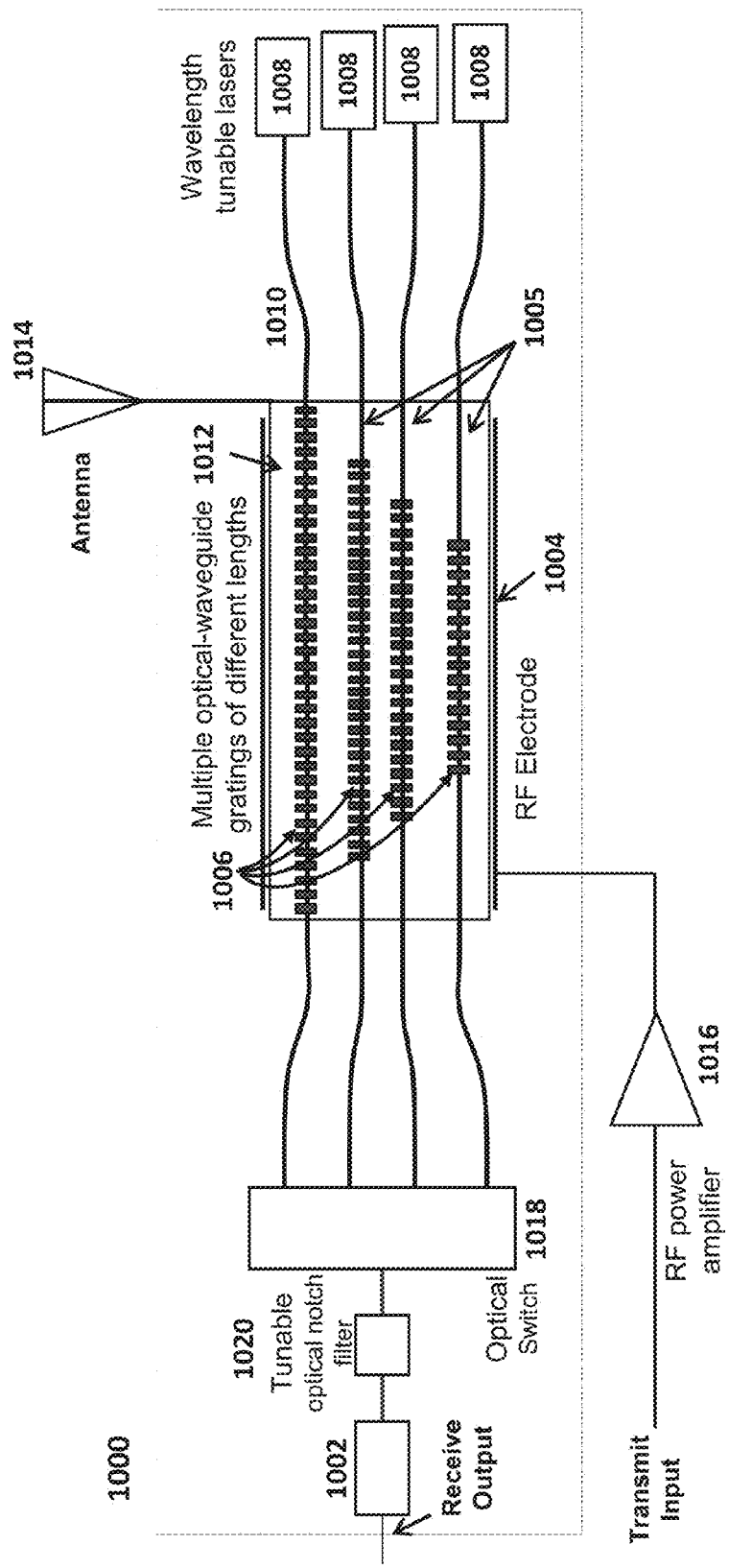
FIG. 10 shows a photonic RF circulator with a velocity-matched modulator comprising multiple optical grating waveguides and a tunable optical notch filter.
Figure 11:
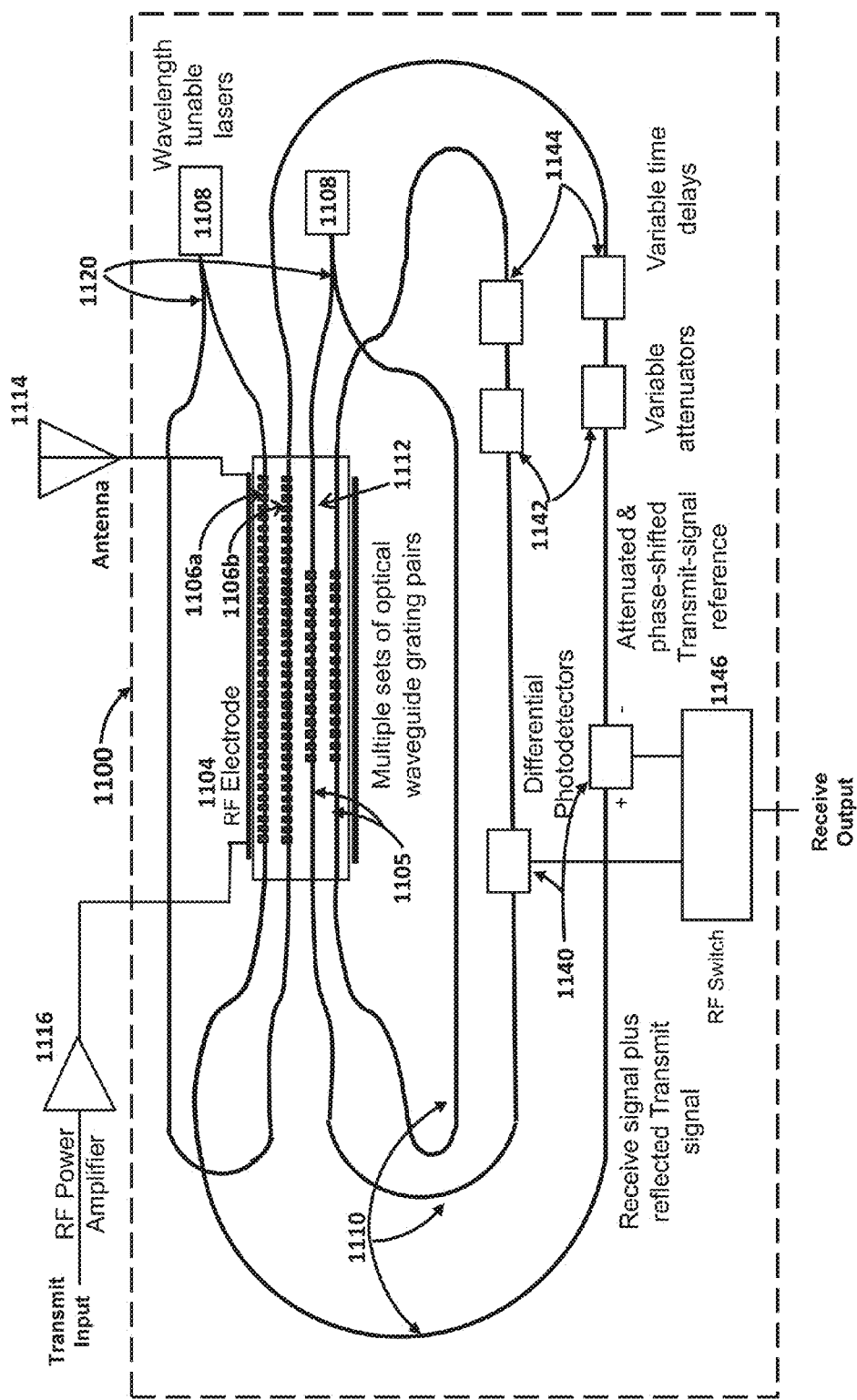
FIG. 11 illustrates a photonic RF circulator for cancellation of reflected RF transmit signals.
Figure 12:
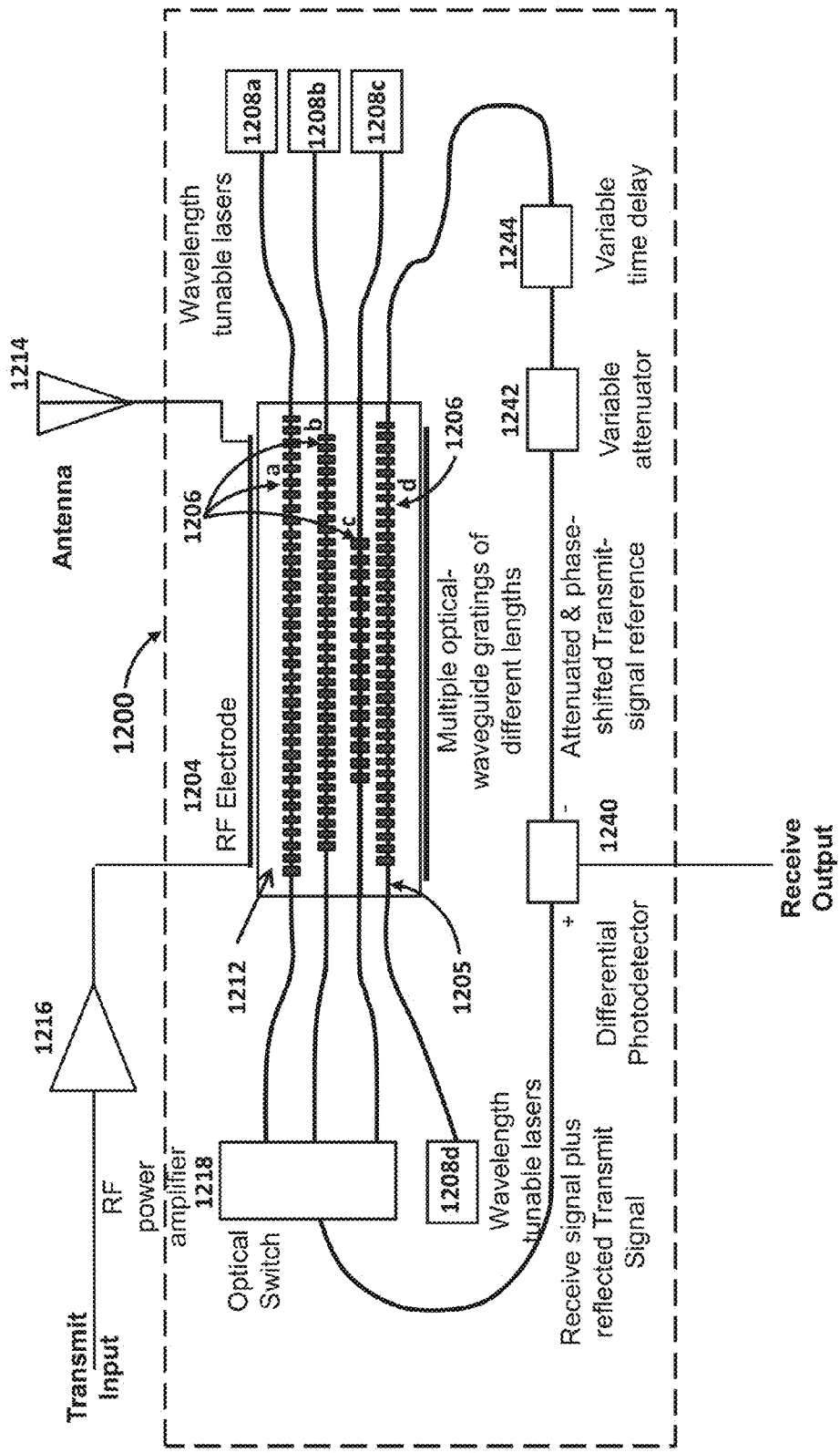
FIG. 12 illustrates an alternative photonic RF circulator for cancellation of reflected RF transmit signals.
Figure 13:
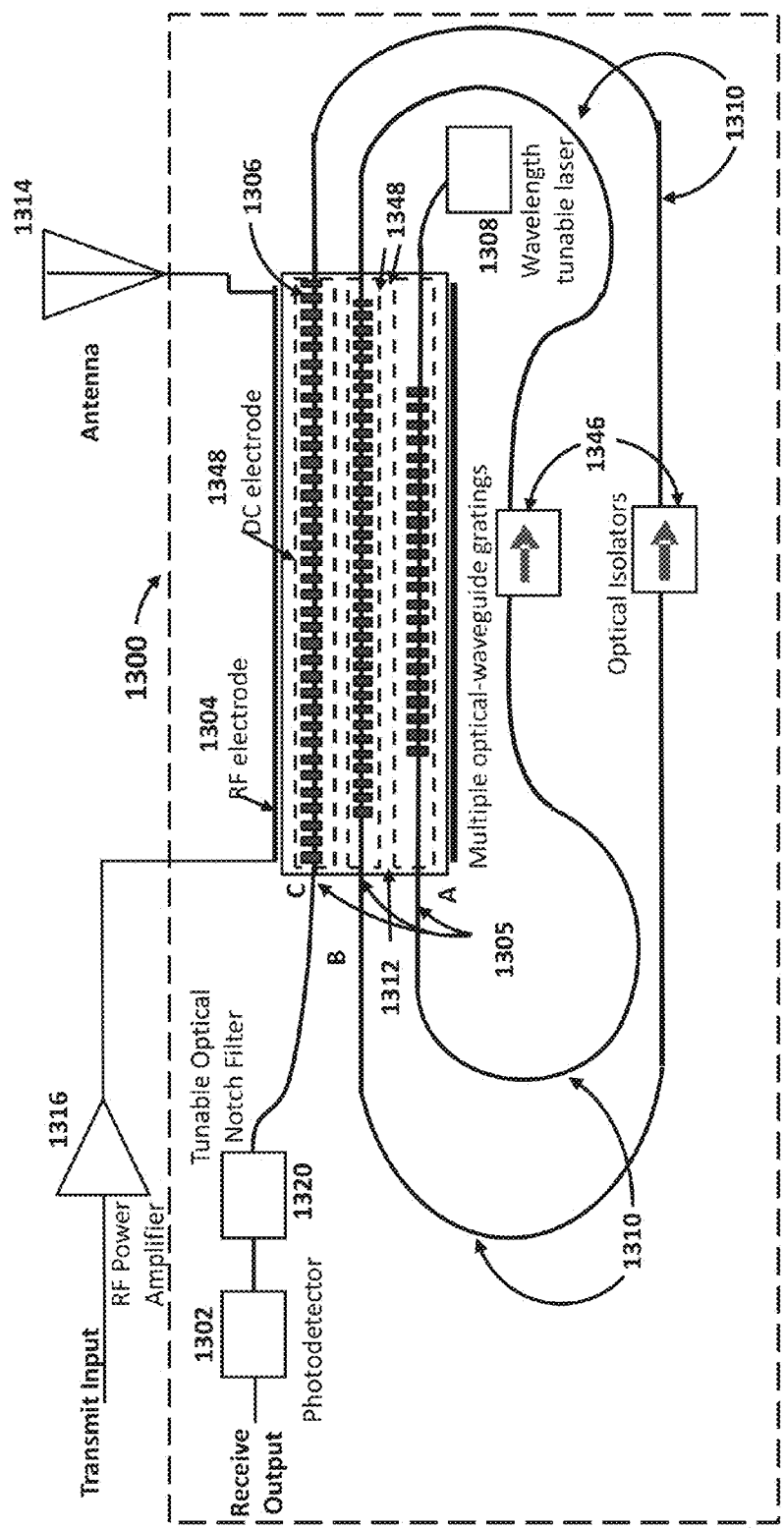
FIG. 13 illustrates a photonic RF circulator with optically cascaded waveguide gratings.

Many variations of the photonic RF circulator 500 in FIG. 5 are within the scope of the principles of the present invention, particularly when combined with the multiple optical waveguide arrangements in FIG. 14. In one embodiment, for example, the photonic RF circulator 500 may have two or more sets of optical waveguide gratings 1406 whose lengths are very different and whose optical outputs are selected by a switch such as illustrated in FIGS. 9, 10 and 12. An alternative embodiment may contain several optical waveguides 1405 that are optically cascaded together such as illustrated in FIG. 13. The photonic RF circulator according to the principles of the present invention may include one or more optical waveguide gratings 1406 in which the RF transmit signal co-propagates with the light transmitted through one optical waveguide grating 1406 and counter propagates through a functionally identical optical waveguide grating 1406, with the modulated light from each optical waveguide grating 1406 being coupled to a photodetector that is part of a differential photodetector pair such as illustrated in FIG. 11.

An alternative embodiment of a photonic RF circulator 900 according to the principles of the present invention shown in FIG. 9 uses a plurality of wavelength tunable lasers 908, a plurality of optical waveguides 905 with a plurality of waveguide gratings 906, not necessarily all of the same length, and one or more optical switches 918. Different lengths of optical waveguide gratings 906 may be used to ensure co-propagation between the received RF signal and the laser light since the frequency of the co-propagating received RF signal is inversely proportional to the length of the optical waveguide grating 906.

As in the photonic RF circulator 500 previously described, an RF power amplifier 916 may be included in the transmit path to amplify the transmit signal before that transmit signal is supplied to the antenna 914. Part of the RF receive path extends from the antenna 914 to an RF electrode 904 that is common to the plurality of optical waveguides 905 and optical waveguide gratings 906, then a second part of the RF receive path extends from a photodetector 902 to the receive output. The optical part of the receive path comprises multiple optical paths with multiple optical waveguides 905 and optical waveguide gratings 906, optical fibers 910, one or more optical switches 918 and a photodetector 902. The RF electrodes 904 are located close enough to the plurality of optical waveguides 905 and optical waveguide gratings 906 to enable the electric field between the RF electrodes 904 to modulate the index of refraction in the optical waveguides 905. The RF modulation signal in the RF electrodes 904 modulate the electric field applied to the electro-optic material of the optical waveguide gratings 906, thereby modulating the coherent reflection of the light from the periodic index steps of the optical waveguide gratings 906. This modulates the optical intensity of the light transmitted through, and coupled out from, the optical waveguides 905.

Continuing with FIG. 9 and according to the principles of the present invention, the laser light to be modulated is coupled from one or more wavelength tunable lasers 908 via the optical fiber 910 to corresponding optical waveguides 905. The optical fibers 910 have low optical insertion loss as well as insensitivity to electro-magnetic interference from the RF signals. Other optical fibers 910 can be used to couple the intensity modulated light from the optical waveguides 905 to the optical switches 918 and the photodetector 902. The optical waveguides 905, optical waveguide gratings 906, and the RF electrodes 904 may be located very close to the antenna 914 and in one alternative embodiment according to the principles of the present invention, may be integrated into the antenna 914 itself. The optical fibers 910 allow locating the wavelength tunable lasers 908, the photodetector 902, and the optical switch 918 some distance away from the antenna 914 without compromising the received RF signal fidelity or incurring electromagnetic interference.

FIG. 9 shows that the laser light to be modulated co-propagates with the received RF signal (951) but counter-propagates to the RF transmit signal (952). The light propagating through an optical waveguide grating 906 can co-propagate (in the same direction) with the RF signal field propagating between the RF electrodes 904. Alternatively, the light propagating through the optical waveguide grating 906 can counter-propagate (in the opposite direction) with the RF signal field propagating between the RF electrodes 904 depending on the location of the connection of the RF signal to the RF electrodes 904.

As with the photonic RF circulator 500, the photonic RF circulator 900 according to the principles of the present invention may use various arrangements of RF electrodes 904 as described with respect to FIG. 14. The optical waveguide gratings 906 are oriented such that they are parallel to the Poynting vector of the electro-magnetic field propagating between the RF electrodes 904, as illustrated in the FIG. 9. The RF field between the RF electrodes 904 overlaps the optical fields in all of the optical waveguide gratings 906.

FIG. 10 illustrates an alternative embodiment according to the principles of the present invention similar to the embodiment in FIG. 9 but with the addition of a tunable optical notch filter 1020 that enable sub-octave operation, that is the notch frequencies (617 in FIG. 6) may be adjusted within an octave of the center frequency of the RF signal. The RF-photonic link of the photonic RF circulator 1000 will have a low noise figure for the co-propagation case of the received RF signal. When the instantaneous bandwidth of the received RF signal is less than one octave, the noise figure of the RF photonic link can be reduced by tuning the optical notch filter 1020 located between the optical switch 1018 and the photodetector 1002, as illustrated in FIG. 10. This tunable optical notch filter 1020 is set to greatly attenuate the wavelength of the laser light from the wavelength tunable lasers 1008 but to pass the wavelengths of the intensity-modulation sidebands. In this way, this embodiment will reduce the effects of the shot noise from the photo detected light and the intensity noise generated by the laser-supplied light from the wavelength tunable lasers 1008. The tunable optical notch filter 1020 is tuned such that the wavelength of its spectral notch coincides with the wavelength of the light from the wavelength tunable lasers 1008. Moreover, the functionality of the optical switch 1018 is coordinated with the wavelength of the tunable optical notch filter 1020 and wavelength tunable lasers 1008. The coordination of the wavelength selection between the optical notch filter 1020, the optical switch 1018 and the wavelength tunable lasers 1008 may be dynamic in time.

The photonic RF circulator 1000 in FIG. 10 makes use of multiple optical waveguide gratings 1006 disposed on the optical waveguides 1005. These optical waveguide gratings 1006 may have different lengths depending on the desired frequency of the co-propagating RF signal and the effective index of refraction of the optical waveguide and the RF waveguide or transmission line.

FIG. 11 illustrates another embodiment according to the principles of the present invention for further reduction of noise within the photonic RF circulator 1100. Persons skilled in the art appreciate the transmit/receive isolation in a conventional RF circulator can be degraded by any reflection of the RF transmit signal from points in the antenna 1114 or from the interfaces between the RF electrodes 1104 of the modulator and the rest of the antenna. This reflected RF transmit signal is not distinguishable from the received RF signal, since they both co-propagate with the light coupled into the optical waveguide gratings 1106. The embodiment of FIG. 11 according to the principles of the present invention illustrates a variation of the photonic RF circulator according to the principles of the present invention that attenuates the effects of the reflected RF transmit signal. The photonic RF circulator 1100 in FIG. 11 operates pairs of optical waveguide gratings 1106a&b with light counter propagating in one optical waveguide 1105 with respect to the paired optical waveguide 1105.

Only two different grating lengths are shown in the FIG. 11, to simplify the drawing, but more optical waveguide grating pairs of other lengths can be incorporated for maximum isolation between the transmit and receive RF signals. The optical waveguide gratings 1106 are grouped into pairs, with each pair having two optical waveguide gratings 1106a and 1106b of the same length. Light from a wavelength tunable laser 1108 is coupled into each optical waveguide grating 1106a and 1106b. That light counter-propagates with respect to the RF transmit signal in a first waveguide grating 1106a of the pair and co-propagates with the RF transmit signal in a second optical waveguide grating 1106b of the pair. For the received RF signal the light co-propagates with the received RF signal in optical waveguide grating 1106a and counter-propagates with the received RF signal in the optical waveguide grating 1106b. The light output from the two optical waveguide gratings of a pair, 1106a and 1106b are coupled to a differential pair of photodetectors 1140. The light from one of these gratings, such as from the grating 1106b, can have its attenuation and time delay adjusted before that light is coupled into its corresponding photodetector 1140 of that differential pair by variable attenuator 1142 and variable time delay 1144 respectively. The adjustment is made such that the modulation of the light at the frequency of the RF transmit signal coupled into the photodetector corresponding to the optical waveguide grating 1406b can cancel the modulation of the light by the reflected RF transmit signal in the optical waveguide grating 1106a. The reflected RF transmit modulated light is coupled into the photodetector of the differential pair that corresponds to the optical waveguide grating 1106a. Depending on the relative amount of reflected to non-reflected RF transmit signal, the amount of light supplied to the two optical waveguide gratings 1106a and 1106b of a pair also can be adjusted with the optical signal splitters 1120.

Note that for this photonic RF circulator 1100 according to the principles of the present invention, an RF switch 1146 (rather than an optical switch) is used to select the desired receive output for coarse tuning of the frequency for maximum transmit receive isolation. The RF switch 1146, like the optical switch of FIGS. 9 and 10 can be operated at microsecond speeds, to select the RF frequency of maximum isolation.

The adjustment of the time delay with the variable time delay 1144 aligns the time scale of the intensity modulation produced by the RF transmit signal on the light output from the optical waveguide grating 1106b to match the time scale of the intensity modulation by the reflected RF transmit signal on the light output from the optical waveguide grating 1106a. The adjustment by the variable optical attenuator 1142 is done to obtain the desired cancellation of the reflected RF transmit signal. A calibration procedure may be implemented using a test RF-transmit signal, but no received signal, to establish the settings for the variable time delay 1144 and variable attenuator 1142. This calibration procedure may need to be repeated for different frequency values of the RF transmit signal, since the reflection point and power of the reflected RF transmit signal may depend on the frequency of the RF transmit signal.

The remaining components: RF power amplifier 1116, antenna 1114, fiber optic cable 1110, optical waveguides 1105 and RF electrodes 1104 are functionally the same as components 1016, 1014, 1010, 1005 and 1004 in the embodiment of FIG. 10.

FIG. 12 shows another alternative of the photonic RF circulator according to the principles of the present invention in which different wavelength tunable lasers 1208 are coupled to different optical waveguide gratings 1206 whose optical output are selected by an optical switch 1218 to compensate for reflections of the RF transmit signal from points in the antenna or from the interfaces between the RF electrode 1204 of the modulator and the rest of the antenna 1214. These optical waveguide gratings 1206a-1206c receive laser light from different wavelength tunable lasers 1208a, 1208b and 1208c and the laser light transmitted through these optical waveguide gratings 1206 counter-propagate to the RF transmit signal. The light from one of the optical waveguide gratings 1206a, 1206b or 1206c can be differentially compared to the light from optical waveguide grating 1206d.

Without implying a limitation, three optical waveguide gratings 1206a, 1206b and 1206c are shown in this figure as being coupled to the same optical switch 1218 and differential photodetector 1240. The optically selected output from these 3 optical waveguide gratings 1206 a-c can be considered as a first grating output of a pair of two grating outputs similar to that discussed with respect to the embodiment of FIG. 11. The second optical waveguide grating output of that pair is obtained from an optical waveguide grating 1206d for which the laser light is supplied to co-propagate with the RF transmit signal. The two optical waveguide grating outputs are coupled to two photodetectors of a differential photodetector 1240, much like the outputs from the first and second optical waveguide gratings 1106a and 1106b described above regarding the RF photonic 1100 circulator of FIG. 11. The variable attenuator 1242 and variable time delay 1244 shown in FIG. 12 are similar functionally to their corresponding units in FIG. 11, 1142 and 1144 respectively.

The remaining components: RF power amplifier 1216, antenna 1214, fiber optic cable 1210, optical waveguides 1206 and RF electrodes 1204 are functionally the same as components 1016, 1014, 1010, 1006 and 1004 in the embodiment of FIG. 10

FIG. 13 illustrates an embodiment of the photonic RF circulator 1300 in which multiple optical waveguides 1305 are optically cascaded to maximize the interaction between the co-propagating RF signal and light from the wavelength tunable laser 1308. Without implying a limitation, a cascade of 3 optical waveguides 1305 is shown in FIG. 13 but such a circulator could have any number of cascaded optical waveguides 1305. The wavelength tunable laser 1308 supplies light to a first optical waveguide 1305A of the cascade. The light transmitted through that first optical waveguide 1305A is then coupled via an optical isolator 1346 to a second optical waveguide 1305B of the cascade. The light transmitted through the second optical waveguide 1305B is then coupled via another optical isolator 1346 to a third optical waveguide 1305C. The light transmitted through the third optical waveguide 1305C is coupled into a photodetector 1302 via a tunable optical notch filter 1320. The 3 optical waveguides 1305A, 1305B and 1305C and their associated optical waveguide gratings 1306 are arranged physically in parallel and are located sufficiently close to each other to allow a common RF electrode 1304 to span all three optical waveguide gratings yet are spaced laterally such that substantially none of the light propagating in one optical waveguide 1305 couples to another of those optical waveguides 1305. This is true the entire length of the optical waveguide 1305. The multiple optical waveguide 1305 are optically coupled only via their ends and through the optical isolators 1346. The optical isolators 1346 ensure that the coherent optical reflections that occur in each optical waveguide grating 1306 are independent of the coherent optical reflections that occur in the other optical waveguide gratings 1306 and there are no Fabry-Perot-like cavity effects.

This photonic RF circulator 1300 according to the principles of the present invention has an electrode structure that comprises a common RF electrode 1304 and multiple DC-isolated electrodes 1348. These DC-isolated electrodes 1348 are capacitively coupled together such that they operate as a single RF electrode 1304 at the frequencies of the RF transmit signal and the received RF signal. The multiple optical waveguide gratings 1306 are all coupled to the common RF electrode 1304. However, each one of the optical waveguide gratings 1306 is coupled to a different one of the DC-isolated electrodes 1348. The DC-isolated electrode 1348 is used to apply a DC bias electric field to the optical waveguide grating 1306 associated with that DC bias electrode 1348. That DC electric field produces a bias in the refractive index of the electro-optic material of the optical-waveguide grating 1306. The bias in the refractive index affects the coherent reflection occurring at the grating steps and shifts the frequency values at which the modulation of the net transmission through the optical waveguide grating 1306 by a counter-propagating RF field and thus moves a notch in the RF-to-RF link gain (see FIG. 6 for an example of the notches 617 in the RF-to RF link gain). Thus, the applied DC bias electric field is an alternative way to shift the frequency values at which the enhanced transmit/receive isolation is obtained.

At the high frequencies of the RF transmit signal and the received RF signal, the combination of the common RF electrode 1304 and the multiple DC-isolated electrodes 1348 act in the same way as the RF electrode 1304 of the other embodiments of the photonic RF circulator. The received RF signal co-propagates with the light traveling through the optical waveguide gratings 1306. The RF transmit signal counter-propagates to the light traveling through the optical waveguide gratings 1306. Thus, the net modulation produced by the RF transmit signal on the light output from each of the optical waveguide gratings 1306 has notches in the frequency response of the RF photonic link.

This optical waveguide cascade embodiment of the RF circulator 1300 may be useful when the bandwidth of the received RF signal is less than one octave. Note that the RF circulator 1300 according to the principles of the present invention in FIG. 13 also shows an optional tunable optical notch filter 1320 that is used to attenuate the power at the laser wavelength. This reduces the effect of photodetected shot noise and laser intensity noise on the overall signal-to-noise ratio of the RF photonic link for the received RF signal.

For this exemplary photonic RF circulator 1300 according to the principles of the present invention with three optical waveguide in cascade, there are two interconnect sections, with each interconnect section occurring between two successive optical waveguides 1305 of the cascade. In one preferred embodiment, each interconnect section may comprise optical waveguides 1305 segments, optical fibers 1310 and an optical isolator 1346. An optical waveguide grating-to-optical waveguide grating propagation time can be defined as the time elapsed from when a portion of light enters one of the gratings until that portion of light enters a succeeding grating of the cascade. This grating-to-grating propagation time is preferably designed to be the same value for all combinations of successive gratings in the cascade. Thus, the lengths of the optical fibers in each of the interconnect sections are preferably set to make these propagation times equal. It also is desirable to make this grating-to-grating propagation time as short as possible, while still considering the desire for maintaining low optical insertion loss (which constrains the minimum radius of bend or curves in the optical waveguide segments and the optical fibers 1310). For the case of the co-propagating received RF signal, it is desired that the bandwidth at which high RF-to-RF link gain is achieved is large. This is achieved by making the grating-to-grating propagation time equal to a multiple of the time-period of one cycle at the center frequency of the band of energies in the received RF signal (i.e., the center frequency of the Fourier transform components of the received RF signal). Alternatively, the grating-to-grating propagation time could be selected to equal a multiple of the time-period of one cycle at the center frequency of the Fourier transform spectrum of the received RF signal. The result of making the grating-to-grating propagation times for the various stages of the cascade equal to each other and approximately equal to a multiple of the time-period of the received RF signal is that the modulations of the net transmission of light through each of the gratings will be synchronized. As the grating-to-grating propagation times depart from being equal to each other or to a multiple of a period at a given frequency component of the received RF signal, this synchronization is degraded and the positive reinforcement of the grating modulations achieved by the cascade is reduced. The grating-to-grating propagation time also preferably is shorter than one-half period of the highest frequency component of the received RF signal, to ensure that the RF-photonic link gain is not degraded. If this condition is not met, the net modulation in one optical waveguide grating 1306 will partially cancel the net modulation in another optical waveguide grating 1306 of the cascade.

The time waveform of the modulated light obtained at the output of the cascade of multiple optical waveguides 1305 is a convolution of the time waveforms of the modulated light obtained from each of the optical waveguide gratings 1306 in that cascade. The composite frequency response, or the RF-to-RF link gain vs frequency, obtained for the RF-photonic link with the cascade of multiple optical waveguides 1305 is the multiplication of the RF-to-RF link frequency responses that would have been obtained for separate links each comprising one of the cascaded optical waveguide 1312. The multiplication is done in the frequency domain. Thus, the overall effect of the cascade of optical waveguide gratings 1306 is that the RF-to-RF gains associated with each of the optical waveguide gratings 1306 are multiplied together at each frequency value of the RF signal. This multiplication can produce in-band spurs when the bandwidth of the received RF signal is greater than one octave. The photodetector 1302, or an RF filter (not shown in FIG. 13) following the photodetector 1302, should have a passband that matches the frequency spectrum of the received RF signal but that attenuates the higher-frequency harmonics that are produced by the cascaded optical waveguides 1305. Note that this multiplication and filtering process comes at the price of higher RF-to-RF insertion loss for the overall RF-photonic link, since the energy in those higher-frequency harmonics is discarded. Nevertheless, the value of the RF-to-RF link gain obtained for the co-propagated modulation by the RF received signal can be greater for a cascade of multiple optical waveguide gratings 1306 than it is for a single optical waveguide grating 1306. However, the main benefit of a cascaded optical waveguide grating 1306 configuration of the photonic RF circulator 1300 is that for the modulations produced by the counter-propagating RF transmit signal, the notches in the frequency responses associated with the cascaded optical waveguide gratings are combined together. Thus, the resulting frequency response of the photonic RF circulator 1300 has all of the notches from the net modulations of the optical transmissions of all of the optical waveguide gratings 1306 in the cascade. In effect, the notches represent frequencies at which the modulation is approximately zero.

The separate DC bias voltages previously discussed may be applied to each of the DC-isolated electrodes 1348 to produce a variable DC electric field that tunes the center frequencies of the response notches associated with the counter-propagated modulation of the transmission of light from each of the optical waveguide gratings 1306. Different optical waveguide gratings 1306 of the cascade can have different values of DC electric field applied to them. Also, those different optical waveguide gratings 1306 can have different lengths of the grating. Thus, the counter-propagated modulation response notches occur at different sets of frequencies, with each set of frequencies being tuned independently by the bias voltage applied to a different one of the DC-isolated electrodes 1348.

Independent tuning of the modulation response notches makes the photonic RF circulator 1300 compatible with antenna elements in a phased array antenna that produces multiple simultaneous beams at differing, independent, frequencies. These modulation notch center frequencies may be set such that the notches associated with the modulation responses of different gratings can be tuned to at least partially overlap with each other. Thus, the resulting response of the photonic RF circulator 1300 is a wider notch for the modulation produced by the counter-propagated RF transmit signal. Such wider notches enhance the transmit/receive isolation and enables the photonic RF circulator 1300 to be used with larger bandwidth RF transmit signals such as spread-spectrum communications or radar waveforms.

It should be understood that the above-described embodiments are merely some possible examples of embodiments of the principles of the present invention. Many variations and modifications may be made to the above-described embodiments of the invention without departing substantially from the principles of the invention. In particular, the features of individual embodiments described herein may be combined into new embodiments. All such modifications and variations are intended to be included herein within the scope of this disclosure of the principles of the present invention and protected by the following claims.

What is claimed is:

1. A photonic RF circulator comprising:
   an Electro Optic Modulator;
   wherein the Electro Optic Modulator comprises at least one optical waveguide with an optical grating disposed thereon;
   the optical grating having a first end and a second end;
   at least one pair of RF electrodes in electro-optic communication with the at least one optical waveguide;
   wherein the pair of RF electrodes are adapted to receive an RF Receive signal at a first end of the RF electrodes and an RF Transmit signal at a second end of the RF electrodes;
   wherein the first end of the optical grating is coincident with the first end of the RF electrode and the second end of the optical grating is coincident with the second end of the RF electrode;
   at least one laser light source transmitting laser light into the Electro Optic Modulator at the first end of the optical grating;
   at least one photodetector generating an electrical signal from the laser light received from the Electro-Optic Modulator
   wherein the optical grating is adapted to have a notch in a link gain of the RF Transmit signal more than 40 dB less than a link gain of the RF Receive signal.

2. The photonic RF circulator of claim 1 wherein the optical waveguide comprises titanium diffused lithium niobate, gallium arsenide or polymers that change index of refraction when subject to an electric field.

3. The photonic RF circulator of claim 1 wherein the RF electrodes are arranged to form a co-planar waveguide.

4. The photonic RF circulator of claim 3 wherein the Electro Optic Modulator comprises a plurality of optical waveguides each with one of a plurality of optical gratings disposed thereon.

5. The photonic RF circulator of claim 1 wherein the RF electrodes are disposed opposite each other.

6. The photonic RF circulator of claim 5 wherein the Electro Optic Modulator comprises a plurality of optical waveguides each with one of a plurality of optical gratings disposed thereon.

7. The photonic RF circulator of claim 1 wherein the Electro Optic modulator comprises a plurality of optical waveguides and a plurality of optical gratings; and
   the RF electrodes comprise a common RF electrode and a plurality of DC-isolated electrodes wherein each DC isolated electrode is in electrical communication with a distinct optical waveguide.

8. A photonic RF circulator comprising:
   a plurality of Electro Optic Modulators;
   at least one laser light source transmitting laser light into at least one of the plurality of Electro Optic Modulators;
   at least one photodetector generating an electrical signal from light received from at least one of the plurality of Electro-Optic Modulators; and
   wherein each Electro Optic Modulator comprises at least one optical waveguide with an optical grating disposed thereon;
   at least one pair of RF electrodes in electrical communication with the at least one optical waveguide;
   wherein the pair of RF electrodes are adapted to receive an RF Receive signal at a first end of the RF electrodes and an RF Transmit signal at a second end of the RF electrodes;
   wherein the optical grating is adapted to have a notch in a link gain of the RF Transmit signal more than 40 dB less than a link gain of the RF Receive signal.

9. The photonic RF circulator of claim 8 wherein the Electro Optic Modulators are connected in parallel.

10. The photonic RF circulator of claim 8 wherein the Electro Optic Modulators are connected in series.

11. The photonic RF circulator of claim 8 wherein pairs of the Electro Optic Modulators are connected such that the light propagating in the first optical waveguide of the pair travels in a direction opposite to that of the light in the second optical waveguide of the pair.

12. A photonic RF circulator comprising:
   a plurality of Electro-Optic Modulators;
   a plurality of laser light sources each transmitting laser light into at least one of the plurality of Electro-Optic Modulators;
   at least one photodetector generating an electrical signal from light received from at least one of the plurality of Electro-Optic Modulators; and
   wherein each Electro-Optic Modulator comprises at least one optical waveguide with an optical grating disposed thereon;
   at least one pair of RF electrodes in electrical communication with the at least one optical waveguide;
   wherein the pair of RF electrodes are adapted to receive an RF Receive signal at a first end of the RF electrodes and an RF Transmit signal at a second end of the RF electrodes, and wherein the optical grating is adapted to have a notch in a link gain of the RF Transmit signal more than 40 dB less than a link gain of the RF Receive signal.

13. The photonic RF circulator of claim 12 wherein the plurality of laser light sources are tunable.

14. The photonic RF circulator of claim 13 further comprising an optical switch arranged to select one light received from one of the plurality Electro-Optic modulators and the at least one photodetector generating the electrical signal from the light received from the optical switch.

15. The photonic RF circulator of claim 12 further comprising a wavelength tunable optical notch filter between the at least one photodetector and the light received from at least one of the plurality of Electro-Optic Modulators.

16. The photonic RF circulator of claim 1 wherein the optical grating is adapted such that the notch is tunable at a frequency of the RF Receive signal.

17. The photonic RF circulator of claim 1 wherein the least one laser light source is a wavelength tunable laser.

* * * * *